US008798830B2

(12) United States Patent
Sobue et al.

(10) Patent No.: US 8,798,830 B2
(45) Date of Patent: Aug. 5, 2014

(54) CHARGE CONTROLLER AND NAVIGATION DEVICE FOR PLUG-IN VEHICLE

(75) Inventors: Eiji Sobue, Kariya (JP); Yoshihiko Sugawara, Anjo (JP); Satoshi Kouchiyama, Nagoya (JP); Daisuke Nomura, Chiryu (JP); Ryoichi Ijima, Obu (JP)

(73) Assignee: DENSO CORPORATION, Kariya (JP)

( * ) Notice: Subject to any disclaimer, the term of this patent is extended or adjusted under 35 U.S.C. 154(b) by 755 days.

(21) Appl. No.: 13/025,415

(22) Filed: Feb. 11, 2011

(65) Prior Publication Data

US 2011/0202221 A1    Aug. 18, 2011

(30) Foreign Application Priority Data

Feb. 15, 2010  (JP) ................................ 2010-30018
Jul. 29, 2010   (JP) ............................... 2010-170417
Jul. 29, 2010   (JP) ............................... 2010-170418
Dec. 9, 2010   (JP) ............................... 2010-274589

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ......................................................... 701/22

(58) Field of Classification Search
USPC ......................................................... 701/22
See application file for complete search history.

(56) References Cited

U.S. PATENT DOCUMENTS

2009/0246596  A1 *  10/2009  Sridhar et al. .................. 429/34

FOREIGN PATENT DOCUMENTS

| EP | 2 219 278 | 8/2010 |
|---|---|---|
| JP | H11-178237 A | 7/1999 |

(Continued)

OTHER PUBLICATIONS

Office Action dated Mar. 20, 2013 in corresponding CN patent application No. 201110039423.0 (and English translation).
Office Action mailed Jul. 23, 2013 in the corresponding JP application No. 2010-274589 (English translation).

(Continued)

*Primary Examiner* — Maceeh Anwari
(74) *Attorney, Agent, or Firm* — Posz Law Group, PLC

(57) ABSTRACT

A charge controller for charging a battery of a plug-in vehicle with a plurality of electric power sources includes: a driving route estimation element; an estimated electric power consumption amount calculator; a weather information obtaining element; a sunshine information obtaining element; a solar photovoltaic generation electric power amount calculator; an electric power shortage amount calculator for calculating an electric power shortage amount when the solar photovoltaic generation electric power amount is smaller than an estimated electric power consumption amount; a charge schedule preparation element for preparing a charge schedule, which represents a first charge time for charging the battery with a solar photovoltaic generation system and a second charge time for charging the battery by the electric power shortage amount with another electric power source; and a charge control element for controlling to charge the battery according to the charge schedule.

13 Claims, 8 Drawing Sheets

(56) References Cited

FOREIGN PATENT DOCUMENTS

| JP | 2002-315193 A | 10/2002 |
| JP | 2006-115623 A | 4/2006 |
| JP | A-2007-295680 | 11/2007 |
| JP | A-2008-304337 | 12/2008 |
| JP | 2009-129074 A | 6/2009 |
| JP | A-2009-148121 | 7/2009 |
| JP | A-2009148121 | * 7/2009 |

OTHER PUBLICATIONS

Office Action mailed Jul. 16, 2013 in the corresponding JP application No. 2010-170417 (English translation).

Office Action mailed Jul. 16, 2013 in the corresponding JP application No. 2010-170418 (English translation).

* cited by examiner

CHARGE CONTROLLER AND NAVIGATION DEVICE FOR PLUG-IN VEHICLE

CROSS REFERENCE TO RELATED APPLICATIONS

This application is based on Japanese Patent Applications No. 2010-30018 filed on Feb. 15, 2010, No. 2010-170417 filed on Jul. 29, 2010, No. 2010-170418 filed on Jul. 29, 2010 and No. 2010-274589 filed on Dec. 9, 2010, the disclosures of which are incorporated herein by reference.

FIELD OF THE INVENTION

The present invention relates to a charge controller and a navigation device for a plug-in vehicle, which is capable of being charged from an electric power source of solar photovoltaic generation and other electric power sources.

BACKGROUND OF THE INVENTION

JP-A-2009-148121 teaches that charging of a battery mounted on a plug-in vehicle is performed by utilizing multiple power sources in ascending order according to a unit price of electricity. Further, a charging time of the solar photovoltaic generation, which has the cheapest unit price of electricity, is adjusted based on weather report.

In the above device, since the solar photovoltaic generation having the cheapest unit price of electricity is utilized at a maximum extent in order to charge the battery. Thus, the charging cost is reduced.

However, although an optimum charging plan to a next driving time is executed based on the weather forecast and information of the solar photovoltaic generation, even if a charging amount for the next driving is small, the charging is performed from a commercial power source in a time zone other than a solar photovoltaic generation time zone. In this case, the charging cost is not cheap.

Further, in the above case, the battery is charged with a low cost to the utmost extent until the next driving time. Thus, even when the necessary electric power for driving at the next time is charged in the battery, the battery may be charged excessively.

SUMMARY OF THE INVENTION

In view of the above-described problem, it is an object of the present disclosure to provide a charge controller and a navigation device for a plug-in vehicle, which is capable of being charged from an electric power source of solar photovoltaic generation and other electric power sources. The electric power source of solar photovoltaic generation is utilized to the utmost extent in order to charge a battery of the plug-in vehicle, and unnecessary charge is not performed.

According to a first aspect of the present disclosure, a charge controller for charging a battery of a plug-in vehicle with a plurality of electric power sources including a solar photovoltaic generation system, the controller includes: a driving route estimation element for estimating a next optimum driving route based on information, which an user input; an estimated electric power consumption amount calculator for calculating an estimated electric power consumption amount, which is necessary to travel the next optimum driving route; a weather information obtaining element for obtaining weather information until a next driving time; a sunshine information obtaining element for obtaining sunshine information until the next driving time; a solar photovoltaic generation electric power amount calculator for calculating a solar photovoltaic generation electric power amount until a next driving time based on the weather information and the sunshine information; an electric power shortage amount calculator for calculating an electric power shortage amount when the solar photovoltaic generation electric power amount is smaller than the estimated electric power consumption amount; a charge schedule preparation element for preparing a charge schedule, which represents a first charge time for charging the battery with the solar photovoltaic generation system and a second charge time for charging the battery by the electric power shortage amount with another electric power source; and a charge control element for controlling to charge the battery according to the charge schedule.

In the above controller, the battery is charged from the solar photovoltaic generation system until the next driving time to the utmost extent. Thus, the charge cost is reduced. Even when the weather is not fine and therefore, the solar photovoltaic generation electric power amount is smaller than the estimated electric power consumption amount, the battery is charged from the another electric power source. Thus, the battery is sufficiently charged for the next driving opportunity.

According to a second aspect of the present disclosure, a navigation device for a vehicle includes: the charge controller according to the first aspect of the present disclosure. In this case, the navigation device easily performs to charge the battery of the plug-in vehicle with the plurality of electric power sources including the solar photovoltaic generation system.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment will be explained with reference to FIGS. 1 to 5.

Figure 1:
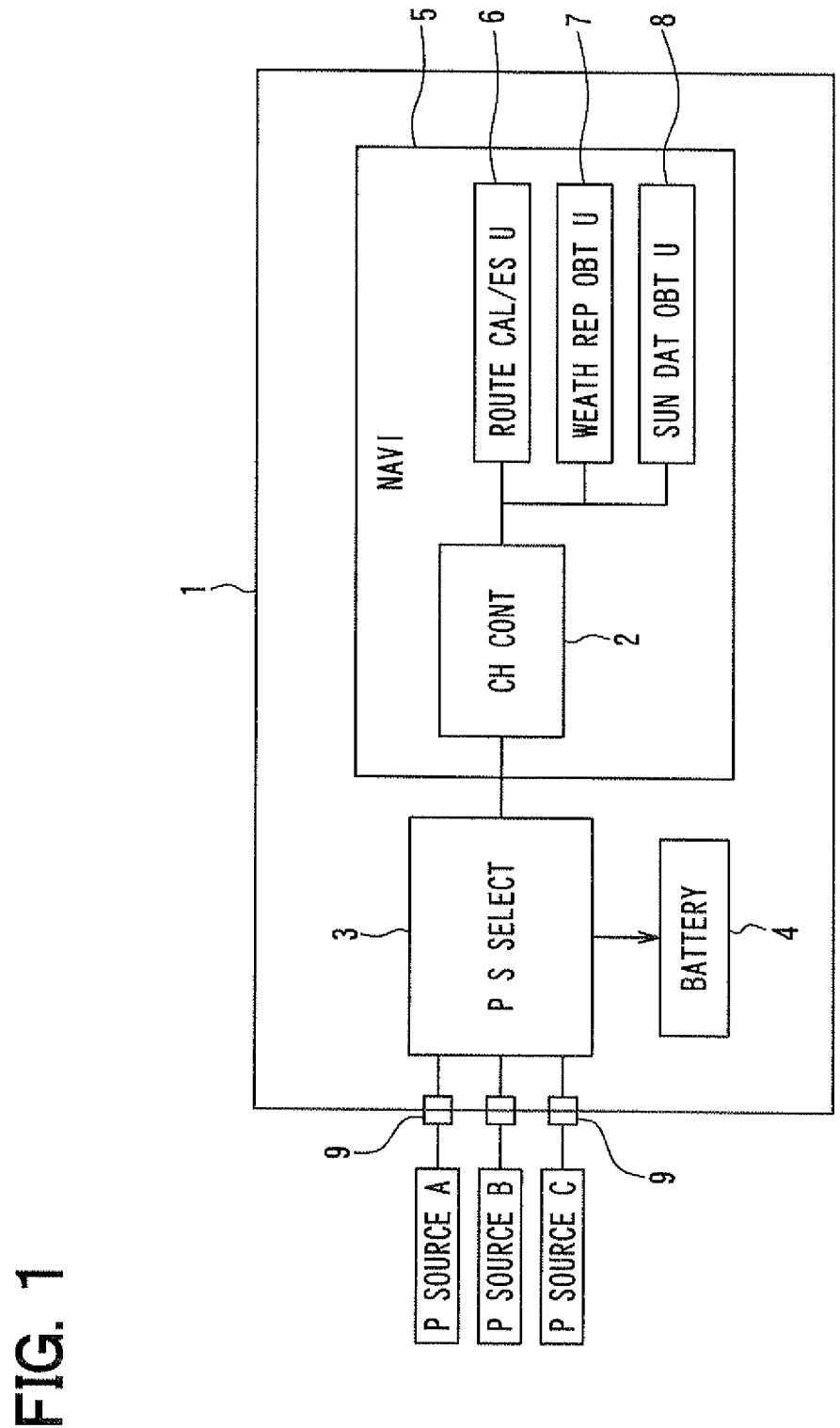
FIG. 1 is a block diagram showing a whole system of a charging controller in a plug-in vehicle according to a first embodiment.

FIG. 1 shows a charge controller 2, which is mounted on a plug-in vehicle 1. The charge controller 2 provides an expected power consumption calculator, a solar photovoltaic generation amount calculator, a power shortage amount calculator, a charge schedule planning element, a charge controlling element, a commute indicator and a memory. The vehicle 1 further includes an electric power source selector 3, a battery 4 and a vehicle navigation device 5. The battery such as a lead battery, a nickel-hydrogen battery and a lithium battery is charged via the electric power source selector 3. The vehicle navigation device 5 controls the electric power source selector 3. The battery 4 of the plug-in vehicle is chargeable from an electric power source disposed outside of the vehicle. The plug-in vehicle is a plug-in electric vehicle having only a motor as a driving power source or a plug-in hybrid vehicle having a combustion engine and a motor as a driving power source. In the present embodiment, the plug-in vehicle is the plug-in hybrid vehicle. In FIG. 1, fundamental function elements such as a GPS receiver and a route guidance element are not shown. The navigation device 5 includes the charge controller 2, a route calculation estimation element 6, a weather report obtaining element 7, and a sunrise and sunset time data obtaining element 8. The route calculation estimation element 6 corresponds to a driving route estimation unit, the weather report obtaining element 7 corresponds to a weather information obtaining unit, and the sunrise and sunset time data obtaining element 8 corresponds to a sunshine information obtaining unit.

The electric power source selector 3 is coupled with multiple charge terminals 9. Each terminal 9 is coupled with a respective electric power source A-C via an electric power line. In this case, each charge terminal 9 is coupled with a corresponding terminal of the electric power source A-C via a corresponding electric power line. Thus, the terminal 9 is not coupled with a not-corresponding terminal of the electric power source A-C. The electric power source A-C may be a commercial electric power source supplied from an electric power company, an electric power source supplied by the solar photovoltaic generation, an electric power source supplied by wind-power generation, or a electric power source supplied by an in-house power generation device with using gas or a fuel cell. In this embodiment, the electric power sources A-C include the commercial electric power source and the electric power source supplied by the solar photovoltaic generation. The solar photovoltaic generation system is mounted on a roof of a house or a garage. The solar photovoltaic generation system energizes an electric power to an equipment of the house while the solar photovoltaic generation system generates electricity. When the solar photovoltaic generation system switches from a terminal of the house to one of the multiple charge terminals 9, the solar photovoltaic generation system prioritizes the charge to the vehicle over the energization to the house. After the charge to the vehicle is completed, the solar photovoltaic generation system switches from the one of the multiple charge terminals 9 to the terminal of the house.

The electric power source selector 3 includes an electric power converter having a transformer. The electric power supplied from the selected one of the multiple charge terminals 9 is converted by the transformer to certain electric power to be charged to the battery 4. Further, the electric power source selector 3 includes a voltage sensor for detecting a voltage and a current sensor for detecting a current of an energization path between the electric power converter and an output terminal connecting to the battery 4. The charge controller 2 calculates an electric power amount to be charged to the battery 4 and discharged to a driving motor (not shown) based on the detected current and voltage. Thus, the charge controller 2 detects the current charge electric power amount charged in the battery 4. In this case, the charge electric power amount in the battery 4 shows the electric power amount, which is to be consumed when the plug-in hybrid vehicle firstly runs only with using the battery 4 after last charge.

The charge controller 2 is equipped in the navigation device 5 since the information for forming a charge schedule of executing the charge control to the battery 4 is obtained with using functions in the navigation device 5. In the present embodiment, functions in the charge controller 2 are performed by a processor of the navigation device 5. The functions executed by the route calculation estimation element 6, the weather report obtaining element 7, the sunrise and sunset time data obtaining element 8 and the like are performed by the processor of the navigation device 5.

The route calculation estimation element 6 sets an optimum route from a current position of the vehicle to a destination when the destination is set. Further, the route calculation estimation element 6 calculates an estimated electric power consumption of the battery 4, which is required to travel back and forth between the current position and the destination.

The weather report obtaining element 7 obtains a weather report, which is supplied from an external information center such as a radio broad cast station or a data service center with using a digital radio wave. The weather report is widely utilized as a broad band communication. The weather report obtaining element 7 determines the weather report on the following day, which is an estimated date of next driving plan.

The sunrise and sunset time data obtaining element 8 stores the sunrise time and the sunset time corresponding to the longitude and the latitude. The sunrise and sunset time data obtaining element 8 provides information about the sunrise time and the sunset time corresponding to the longitude and the latitude, which are shown by a GPS data obtained by the navigation device 5. Since the sunrise and sunset time data are standard data corresponding to the longitude and the latitude, it is preferable to consider a light shielding effect of the sunshine caused by an obstacle disposed between the current position of the vehicle and the sun. The obstacle is disposed in a sunrise direction and a sunset direction viewing from the vehicle. For example, when the vehicle is disposed in a mountain area, it is preferable to consider the light shielding effect of mountains, which are disposed around the vehicle. When the vehicle is disposed in an urban area, it is preferable to consider the light shielding effect of buildings, which are disposed around the vehicle. Further, since an irradiation time zone of the sunshine to irradiate the solar photovoltaic generation system may depend on an arrangement place of the solar photovoltaic generation system even when the solar photovoltaic generation system is disposed in the same area. Thus, the irradiation time zone of the solar photovoltaic generation system may be input by an user.

When the user instructs to charge the battery 4 in order to prepare a next trip, the user inputs information about the next trip into the navigation device 5 under a condition that the multiple charge terminals 9 of the plug-in vehicle 1 are connected to an electric power line from the solar photovoltaic generation system and the commercial power source. The navigation device 5 makes a charge schedule based on the input starting time and the destination, and then, the navigation device 5 starts to charge the battery 4.

Figure 2:
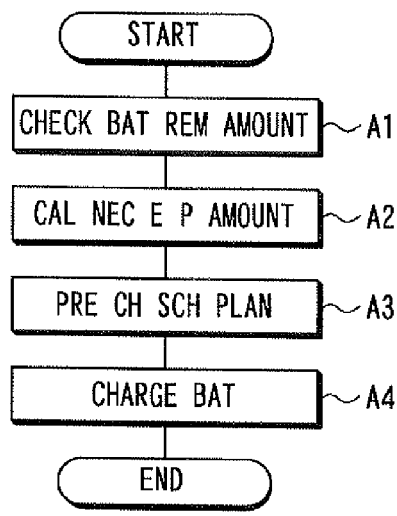
FIG. 2 is a flowchart showing a charging process executed by a vehicle navigation device.

FIG. 2 shows a flowchart showing a charging process executed by the navigation device 5. The navigation device 5 checks a battery remaining amount in step A1 the charge controller 2. Next, in step A2, the charge controller 2 calculates a necessary electric power amount for next driving on the following day or the following time.

Figure 3:
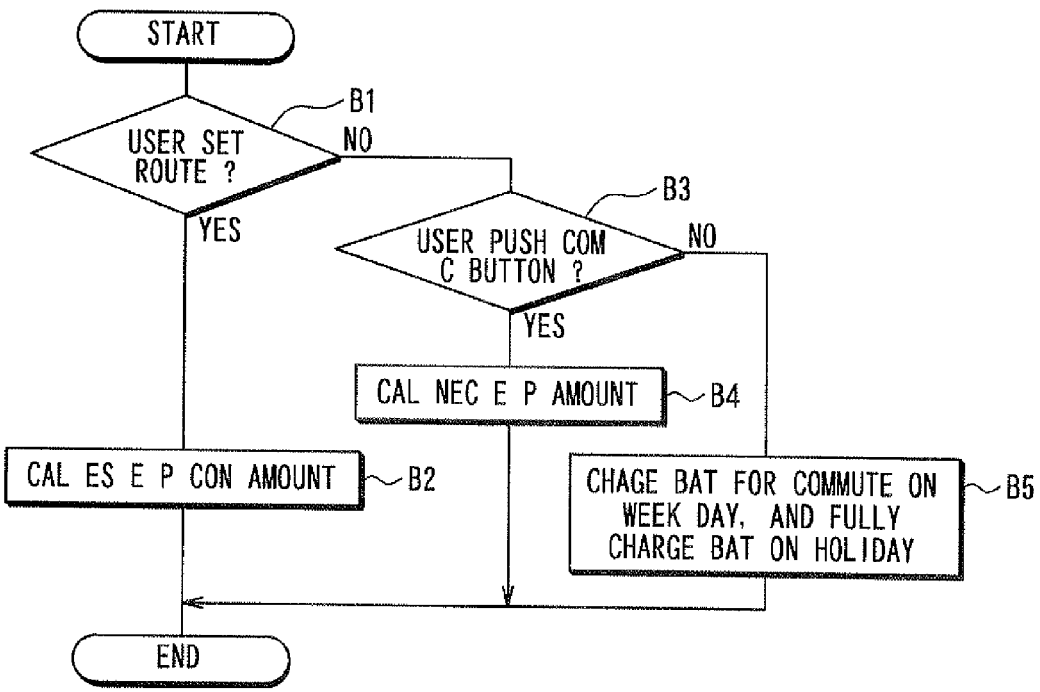
FIG. 3 is a flowchart showing a calculation process of a necessary electric power amount for a next day executed by the navigation device.

FIG. 3 shows a flowchart of calculation of the necessary electric power amount for the next driving. In step B1, the charge controller 2 determines whether the user sets a route such as a destination and an estimated arrival time. When the charge controller 2 determines that the user sets the route for the next driving in the navigation device 5, i.e., when the determination of step B1 is "YES," the navigation device 5 calculates an optimum route from the current position to the destination. Further, the navigation device 5 calculates a necessary electric power amount Y, which is necessary to travel back and forth between the current position and the destination based on a distance between the current position and the destination and data about a fuel consumption amount and/or an electric power consumption amount. In this case, when the optimum route from the current position to the destination is a route on which the vehicle has once run, the estimated electric power consumption amount of the optimum route between the current position and the destination is obtained by multiplying a safety factor with the actual electric power consumption at that time. Although the past data of the actual electric power consumption of the route is utilized as the estimated electric power consumption amount when the optimum route for the next driving is the route along which the vehicle has once driven from the current position to the destination, the navigation device 5 calculates the estimated electric power consumption amount for the next driving when the vehicle has not travel along with the optimum route in the past, or when the vehicle has partially travel along with the optimum route in the past. Specifically, the navigation device 5 calculates the estimated electric power consumption amount by utilizing the past data of the actual electric power consumption amount of a part of the optimum route when the vehicle has traveled along with the part of the optimum route in the past. When the vehicle has not traveled along with the other part of the optimum route or a whole optimum route in the past, the navigation device 5 calculates the estimated electric power consumption amount by utilizing data of a road slanting angle, existence of traffic lights and the like in the map data. Here, the road slanting angle is a slope angle of an upslope or a down slope of the road. Specifically, when the optimum route includes the upslope, the navigation device 5 calculates the estimated electric power consumption amount by increasing the estimated electric power consumption amount according to the road slanting angle and the distance of the upslope from an electric power consumption amount when the vehicle runs on a flat road. When the optimum route includes the down slope, the navigation device 5 calculates the estimated electric power consumption amount by decreasing the estimated electric power consumption amount by a regenerative electric power amount. When the optimum route includes a lot of traffic lights, the electric power consumption amount increases since the number of stops is large. Thus, the navigation device 5 calculates the estimated electric power consumption amount by increasing the estimated electric power consumption amount according to the number of traffic lights. Further, the navigation device 5 calculates the estimated electric power consumption amount by taking into consideration a speed limit in the route, the number of traffic lanes, a distance of a straight road, a distance of a traffic jam when the traffic jam is predicted on the next driving day or the next driving time, and the like. Furthermore, when the optimum route includes a tunnel, or the next driving time includes a night time after sunset, it is necessary to turn on a light, and therefore, the estimated electric power consumption amount increases.

Then, the navigation device 5 calculates the estimated arrival time and the required driving time based on the route calculation result. The navigation device 5 estimates the starting time based on the estimated arrival time and the required driving time. For example, the estimated arrival time is 9 a.m., the required driving time is one hour, and the necessary electric power amount for the round trip to the destination is 50 KW. Here, when it is possible to charge the battery 4 at the destination, the user sets a one-way route in the navigation device 5, and in this case, the necessary electric power amount is a half of the round trip.

When the user uses the vehicle 1 as a commuter vehicle, the destination is the same, and the optimum route is the same. Thus, the necessary electric power consumption amount is easily estimated. In order to reserve the charge of the vehicle 1 for necessary and sufficient electric power amount to commute to work or school, the navigation device 5 may include a charging switch for commute (not shown) on a screen of the display. Thus, the user easily sets the next driving opportunity is the commute by pushing only one button, i.e., the charging switch for commute. Accordingly, in step B3, the navigation device 5 determines whether the user turns on the charging switch for commute. When the navigation device 5 determines that the user turns on the charging switch for commute, i.e., when the determination of step B3 is "YES," the navigation device 5 calculates the necessary electric power amount in step B4 based on a day of the week, the weather report and past data of the actual electric power consumption amount. In this case, when the commute distance is comparatively short, and therefore, the necessary electric power amount is sufficiently prepared only by the solar photovoltaic generation system, the charge controller 2 may control to charge the battery 4 with using only the solar photovoltaic generation system from the sunrise to the starting time. In this case, the charge cost is the lowest.

When the input destination is comparatively near the current position, and/or the scheduled starting time is comparatively late, so that the necessary electric power amount is sufficiently prepared only by the solar photovoltaic generation system, the charge cost is the lowest since the charge controller 2 may control to charge the battery 4 with using only the solar photovoltaic generation system from the sunrise to the scheduled starting time. Even when the necessary electric power amount is sufficiently prepared only by the solar photovoltaic generation system, it is preferable to charge the battery with using the solar photovoltaic generation system to the utmost extent during the daytime, i.e., during the sunshine hours.

When the user does not set the route, i.e., when the determination of step B1 is "NO," and the user does not turn on the charge switch for commute, i.e., the determination of step B3 is "NO," the navigation device 5 estimates based on the calendar whether the user utilizes the vehicle for commute. Specifically, when the following day is a weekday, the navigation device 5 presumes that the user utilizes the vehicle for commute for the next driving time. When the following day is a day off or a holiday, the charge controller 2 controls to fully charge the battery 4 since the user may not utilize the vehicle for commute.

Next, in step A3 of FIG. 2, the navigation device 5 prepares a charge schedule plan.

Figure 4:
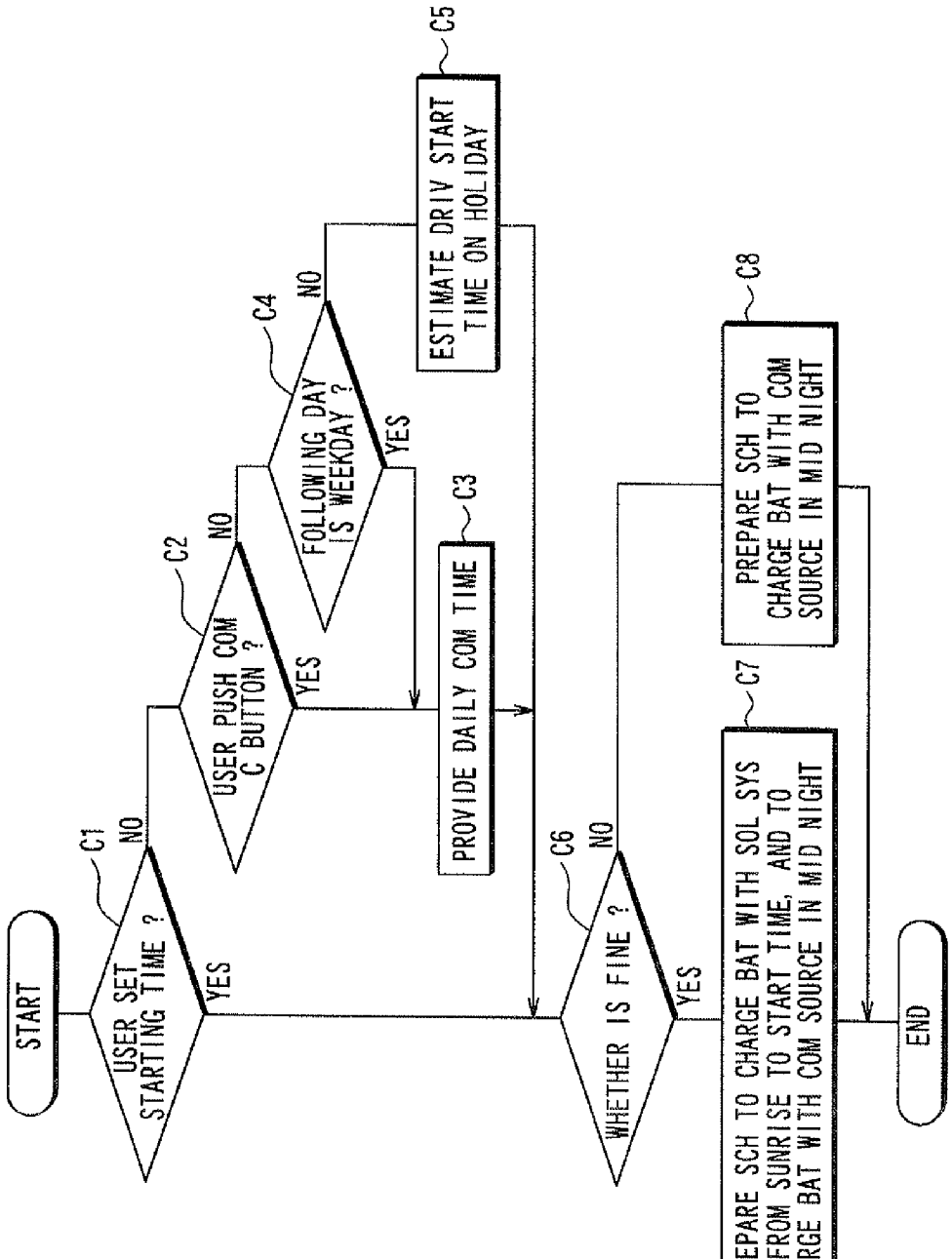
FIG. 4 is a flowchart showing a planning process of a charging schedule executed by the navigation device.

FIG. 4 is a flowchart of the preparation process of the charge schedule plan. The navigation device 5 determines in step C1 whether the user sets the scheduled starting time. When the navigation device 5 determines that the user sets the scheduled starting time, i.e., when the determination of step C1 is "YES," the device 5 obtains the weather report of the following day or the following time from the information center, and determines whether the weather report shows fine weather in step C6. When the weather report shows fine weather, i.e., when the determination of step C6 is "YES," the navigation device 5 presumes based on table data stored in the device 5 that the solar photovoltaic generation system generates electricity of, for example, 10 KW/h. This average generation electricity depends on the date and the time zone even when the weather is fine. Specifically, when the charge time is near the sunrise or the sunset, the average generation electricity is small, and the charge time is around noon, the average generation electricity is the maximum. Thus, the table data includes detailed data of the average generation electricity according to the date and the time zone.

The device 5 obtains the date of the following day based on the calendar. Further, the device 5 obtains the sunrise time and the sunset time of the following day based on the sunrise and sunset time table data stored in the device 5. The sunrise and sunset time table data shows a relationship between the position in Japan or a country in which the vehicle is disposed (i.e., the longitude and the latitude) and the sunrise and sunset time on the date. For example, when the sunrise time is 6 a.m., and the scheduled starting time is 8 a.m., the electricity generation time of the solar photovoltaic generation system is two hours from 6 a.m. to 8 a.m before departure. Thus, the charge amount of electricity is calculated by multiplying two hours with 10 KW/h so that the charge amount of electricity is 20 KW (=10 KW/h×2 h). Accordingly, since the necessary electric power amount for the round trip to the destination is 50 KW, it is necessary to charge the battery with 30 KW (=50 KW−20 KW) during the night time, i.e., before the sunrise.

When the commercial power source charges the battery with 20 KW/h, it is necessary to charge the battery 4 with using the commercial power source for 1.5 hours (=30 KW/20 KW/h) before the sunrise. In this case, the charge cost of the commercial power source is cheap in the night time, specifically, in the middle of the night, compared with the day time since the unit price of the electricity in the night time zone of the commercial power source is cheaper than that in the day time zone. Thus, the device 5 determines whether the night time zone of the commercial power source is wider than one hour and a half. When the night time zone of the commercial power source is wider than 1.5 hours, the device 5 prepares the charge schedule plan in step C7 such that the battery 4 is charged with using night time electricity from the commercial power source. When the required charge time with using the commercial power source is larger than the night time zone of the commercial power source, i.e., when the night time zone of the commercial power source is narrower than 1.5 hours, the device 5 prepares the charge schedule plan such that the battery 4 is charged with using night time electricity from the commercial power source in the night time zone and using normal electricity (i.e., day time electricity) from the commercial power source in residual time zone to charge the difference between the required charge and the charge of the night time electricity.

When the device 5 determines that the weather report does not show fine weather in step C6, i.e.; when the determination of step C6 is "NO," the solar photovoltaic generation system may not sufficiently charge the battery 4. Thus, the device 5 prepares the charge schedule plan in step C8 such that the battery 4 is charged with using night time electricity from the commercial power source. In this case, when the required charge time with using the commercial power source is larger than the night time zone of the commercial power source, the device 5 prepares the charge schedule plan such that the battery 4 is charged with using night time electricity from the commercial power source in the night time zone and using normal electricity (i.e., day time electricity) from the commercial power source in residual time zone to charge the difference between the required charge and the charge of the night time electricity.

The device 5 determines in step C2 whether the user pushes the commute charge button, i.e., the device 5 determines whether the user turns on the charge switch for commute. Further, the device 5 determines in step C4 whether the following day is a week day when the determination of step C2 is "NO". When the user turns on the commute charge button, i.e., when the determination of step C2 is "YES," or when the following day is a week day, i.e., when the determination of step C4 is "YES," it goes to step C3. In step C3, the device 5 provides the commute time on every day. Then, it goes to step C6. In steps C7 and C8, the device 5 prepares the charge schedule plan based on the weather report. When the following day is not a week day, i.e., when the following day is a holiday or a day off, i.e., when the determination of step C4 is "NO," it goes to step C5. In step C5, the device 5 estimates a starting time of driving based on a driving history of the holiday. Then, it goes to step C6. In steps C7 and C8, the device 5 prepares the charge schedule plan based on the weather report.

When the weather report of the following day shows a cloudy day or a rainy day, the solar photovoltaic generation system does not substantially charge the battery 4. In this case, the charge from the solar photovoltaic generation system is substantially zero. Then, the device 5 prepares the charge schedule plan such that the battery 4 is charged with using night time electricity from the commercial power source to the utmost extent. When the device 5 presumes that the user operates a wiper and/or turns on a light of the vehicle and/or operates an air conditioning system in case of a rainy day or a cloudy day, it is necessary to prepare the charge schedule plan to increase the estimated electric power consumption amount.

Thus, based on the charge schedule plan, the solar photovoltaic generation system is utilized to charge the battery 4 to the utmost extent, when the charge amount from the solar photovoltaic generation system is not sufficient, the commercial power source supplies the shortage of the charge amount with using night time electricity, and further, when the charge amount from the solar photovoltaic generation system and the charge amount from the commercial power source with using the night time electricity are not sufficient, the battery 4 is charged from the commercial power source with using the normal time electricity (i.e., day time electricity).

Figures 5, 6:
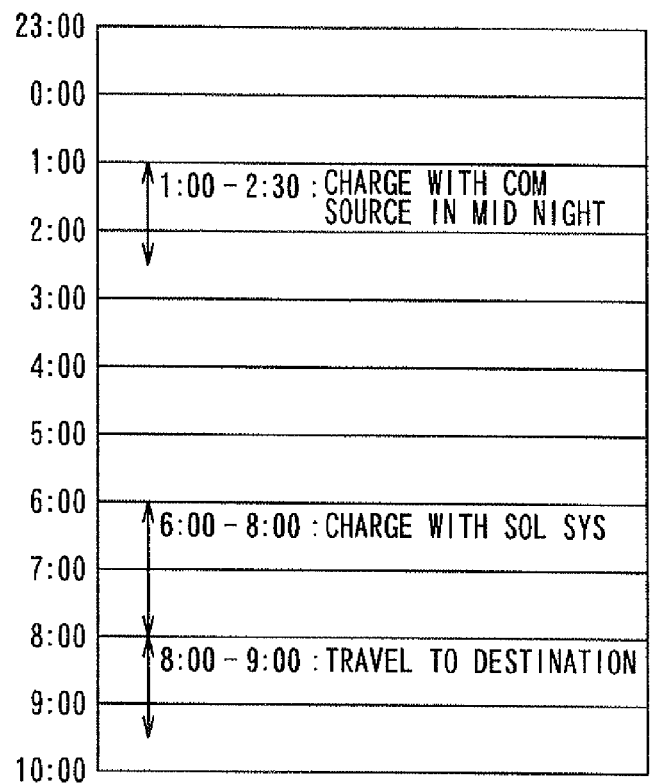
FIG. 5 is a diagram showing an example of the charging schedule.
FIG. 6 is a diagram showing a data structure of a scheduler according to a second embodiment.

FIG. 5 shows an example of the charge schedule plan.

In FIG. 5, the battery 4 is charged from the commercial power source with using the night time electricity from 1:00 a.m. to 2:30 a.m. The battery 4 is charged from the solar photovoltaic generation system from 6:00 a.m. to 8:00 a.m. The vehicle travels to the destination from 8:00 a.m. to 9:00 a.m.

The device 5 switches the electric power source selector 3 so that the electric power source for charging the battery 4 is switched between the solar photovoltaic generation system and the commercial power source.

When the actual charge electric power amount is extremely small in the time zone, in which the solar photovoltaic generation system charges the battery 4, the device 5 automatically switches from the solar photovoltaic generation system to the commercial power source. Thus, even if the weather report is wrong, the device 5 protects the battery 4 from the shortage of the charge amount so that the vehicle drives normally.

Further, when the next driving schedule day is a day after the following day, the battery 4 is charged only by the solar photovoltaic generation system on the following day, and then, the navigation device 5 may prepare a new charge schedule plan of the day after the following day and the following day based on the charge electric power amount of the battery at that time after the sunset of the following day.

In the present embodiment, the following effects are obtained.

The navigation device 5 obtains the estimated electric power consumption amount, which is necessary to drive at the next time, based on the estimated arrival time and the destination of the next driving time, which are input by the user. Based on the sunrise time and the sunset time and the weather report at the next driving time, the device 5 forms the charge schedule plan for charging the battery 4 with using the solar photovoltaic generation system to the utmost extent until the scheduled starting time. Since the device 5 controls to charge the battery 4 according to the charge schedule plan, the charge cost is reduced. Further, the battery 4 is charged from the commercial power source when the charge electric power amount from the solar photovoltaic generation system is smaller than the necessary estimated electric power consumption amount for the next driving time. Thus, the electric power for the next driving time is sufficiently secured.

Since the battery 4 is charged by the commercial power source with using night time electricity, the charge cost is reduced.

Further, the device 5 prepares the charge schedule plan in view of the sunrise time and the sunset time at the present position, and therefore, the solar photovoltaic generation is utilized to charge the battery 4 to the utmost extent even when the current position of the vehicle is disposed at any longitude and latitude.

Since the device 5 includes a function for obtaining the current position information and/or the weather report, the current position information and the weather report are easily obtained.

Second Embodiment

Figure 7A:
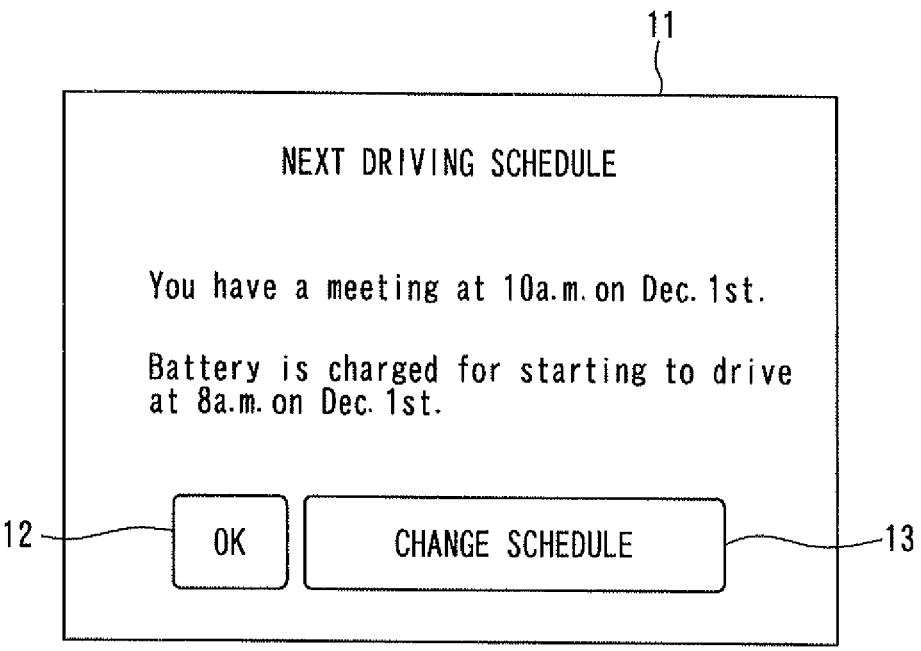
FIGS. 7A and 7B are diagrams showing images on a display.
Figure 7B:
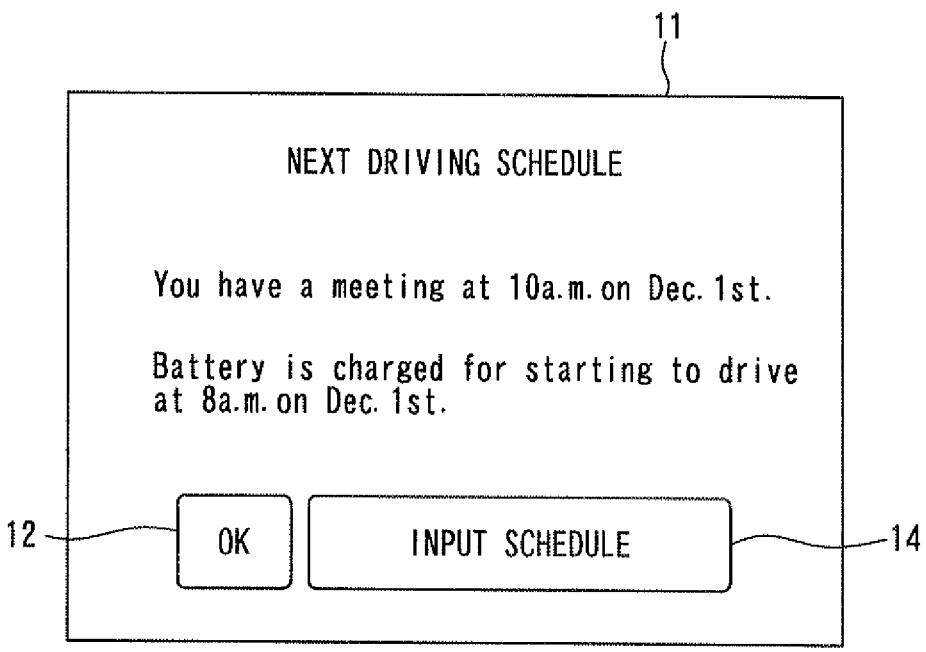

A second embodiment will be explained with reference to FIGS. 6, 7A and 7B. In the first embodiment, it is necessary to input a new destination for the next driving time. Recently, schedule information is preliminary input into a mobile communication device such as a mobile personal, computer, a PDA (personal digital assistant) and a cell phone with a scheduling function having a Bluetooth function so that the mobile communication device manages the date and the place for an outgo. It is redundant to input the schedule information again in the navigation device 5. Further, the user may mistakes to input the schedule information again in the navigation device 5.

In the present embodiment, the navigation device 5 functions as a schedule information obtaining element receives, i.e., obtains the preliminary input schedule information from the mobile communication device (i.e., a schedule controller) with the Bluetooth function when the user brings the mobile communication device having the Bluetooth function in the compartment of the vehicle. Thus, when the schedule information showing the destination of the vehicle, i.e., showing the usage of the vehicle by the user, exists in the mobile communication device, the device 5 sets the outgo information in the schedule information as the destination. In this case, when the schedule information includes multiple destinations or multiple times or days for the outgo, i.e., the usage of the vehicle, the device 5 sets the most recent outgo information in the schedule information as the destination. Further, when the schedule information includes multiple outgo information, i.e., multiple destinations, on the same day, the device 5 sets the outgo information in the schedule information in order of distance from the current position as the destination. Thus, the device 5 determines whether the user registers the outgo information with usage of the vehicle as the destination. The device 5 functions to execute a scheduler for managing the outgo information.

FIG. 6 shows a data structure of the scheduler in the mobile communication device. The data structure of the scheduler includes an incident name, a date, an incident starting time, an ending time, a place and a body of the incident. In the present embodiment, a flag for inputting a determination whether the user uses a vehicle is added in the scheduler. When the flag of moving by car is "1," i.e., when the determination is "YES," the user moves to the destination, i.e., the set place, with the vehicle (i.e., car). The destination is registered in the scheduler.

When the user gets in the vehicle with the mobile communication device having the scheduler registering the schedule information, the navigation device 5 obtains the schedule information registered in the mobile communication device with using the Bluetooth function. In this case, the navigation device 5 tries to replace, i.e., synchronize the schedule information obtained from the mobile communication device with the schedule data in the navigation device 5 when the schedule information includes data having the flag of moving by car of "1." When the navigation device 5 tries to integrate, i.e., synchronize the schedule information obtained from the mobile communication device with the schedule data in the navigation device 5 with using the Bluetooth function, a SYNC (synchronization profile) as profiling standards of the Bluetooth function is utilized. Thus, the navigation device 5 stores the destination and the scheduled incident starting time (i.e., the estimated arrival time) at the next driving time.

The navigation device 5 calculates the estimated starting time, at which the vehicle starts to run toward the destination, based on the destination and the scheduled arrival time registered in the device 5. Similar to the first embodiment, the device 5 prepares the charge schedule plan. In this case, since the incident starting time means that the user starts to do something at the destination from the incident starting time, it is preferable to add a predetermined time such as thirty minutes between the incident starting time of the incident and the arrival time of the destination, and then, the departure time (i.e., the starting time) is calculated.

When the vehicle comes back from the destination to the home and the user stops the engine of the vehicle under a condition that the device 5 receives the schedule information from the mobile communication device and registers the schedule information, the navigation device 5 determines that all outgo schedule on the day ends. As shown in FIG. 7A the device 5 prepares the next driving schedule based on the schedule information obtained from the mobile communication device, and displays the next driving schedule on the display 11. In FIG. 7A, the display 11 displays the date and the schedule contents of the next driving schedule, which shows that the user uses the vehicle next time. Further, the display 11 displays an OK button 12 and a schedule change button 13. The OK button 12 shows an inquiry whether the charge schedule is prepared based on the displayed schedule. The schedule change button 13 shows an input of an instruction that the schedule is to be changed. The OK button 12 and the schedule change button 13 correspond to a selection element for selecting whether the charge schedule is appropriate. When the user turns on the OK button 12, the device 5 prepares the charge schedule based on the displayed schedule. When the next destination is not obvious, or the display contents are not proper, so that the user turns on the schedule change button 13, an image of FIG. 7A on the display 11 is switched to another image of FIG. 7B. In FIG. 7B, a message 14 of "please input a schedule" instead of the schedule change button 13 is displayed on the display 11. Thus, the user selects (i.e., touches) a part of the image showing information that the user wants to change, and then, the user changes the information with using a key (not shown). The key corresponds to a correction element. In this case, after the user changes the schedule stored in the navigation device 5, the schedule information in the mobile communication device may be synchronized with the changed schedule in the navigation device 5. Alternatively, after the schedule information stored in the mobile communication device is changed, the schedule stored in the navigation device 5 may be synchronized with the changed schedule information in the mobile communication device.

In the present embodiment, the navigation device 5 synchronizes with the schedule information stored in the mobile communication device, which is brought by the user in the vehicle so that the device 5 prepares the next charge schedule plan. Thus, the user does not input the schedule information of the mobile communication device into the navigation device 5. Thus, the operation load of the user is reduced, and therefore, the input mistake of the user is prevented.

Further, the user confirms whether the schedule information received from the mobile communication device is appropriate, and then, the device 5 prepares the next charge schedule plan based on the confirmed schedule information. Thus, the accuracy of the next charge schedule plan is improved.

Further, when the next schedule information is wrong, the user can correct the schedule information. Thus, the correction of the schedule information is appropriately performed.

When the device 5 receives the schedule information from the mobile communication device, the user may confirm whether the schedule information is appropriate.

When the navigation device 5 is accessible to a server on a cloud network via a wide area communication network, the user may register the schedule information with using a computer in his or her house via the server. The server on the cloud network corresponds to a schedule manager. The navigation device 5 may obtain the schedule information from the server periodically so that the schedule in the device 5 is synchronized with the schedule information in the server when the device 5 turns on.

Third Embodiment

Figure 8:
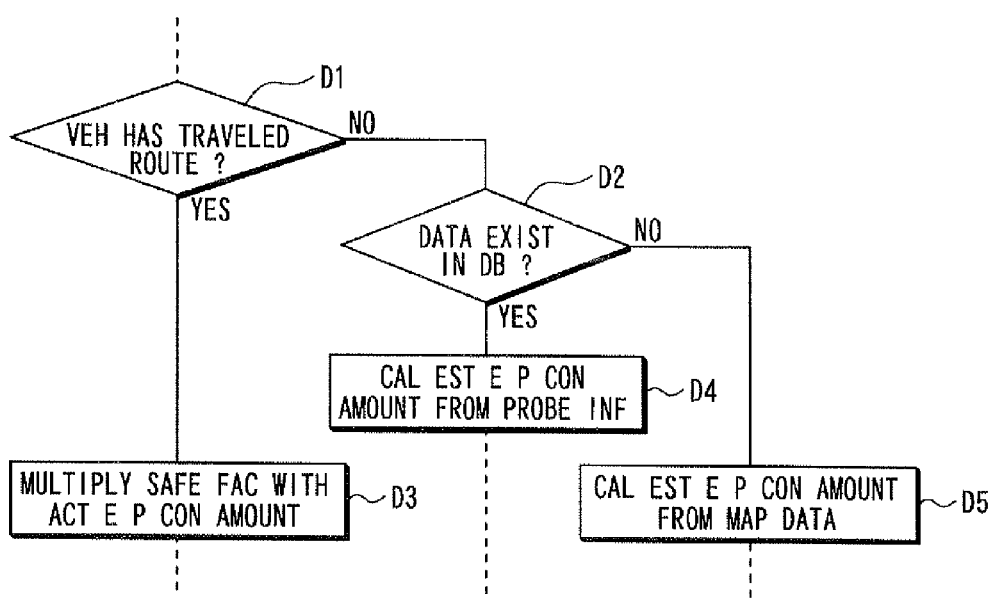
FIG. 8 is a flowchart showing a part of a planning process of a charging schedule executed by the navigation device according to a third embodiment.

A third embodiment will be explained with reference to FIG. 8. In the first embodiment, the method for calculating the estimated electric power consumption amount on the next usage day of the vehicle is performed according to the slant angle of the road and existence of the traffic lights, which are obtained from the map data. However, accuracy of the data from the map data may be insufficient. Specifically, the map data stored in the navigation device 5 is used for obtaining information about a section of the route or a whole route, on which the vehicle has not traveled. However, the map data in the navigation device 5 may not be prepared for calculation of the electric power consumption amount. Thus, the estimated electric power consumption amount may not be calculated appropriately.

In the present embodiment, to improve the calculation accuracy of the estimated electric power consumption amount, information is obtained from an external system. Specifically, recently, a probe vehicle for collecting driving information of the vehicle having a communication device is provided. The communication device in the probe vehicle is always coupled with the information center so that the information center collects and analyzes the driving information from multiple probe vehicles on real time. Then, the information center delivers information such as traffic jam information and rainfall information to each vehicle.

The information collected by the probe vehicle includes the actual electric power consumption amount of the probe vehicle together with the driving route and usage conditions of the vehicle. This information is uploaded to the information center. Thus, a probe vehicle information database in the information center stores the information about the actual electric power consumption amount of the probe vehicle together with the driving route and usage conditions of the probe vehicle. The actual electric power consumption amount data stored in the information center is used for calculating the estimated electric power consumption amount. Specifically, The usage conditions such as a type of the vehicle, the number of passengers, a weight of a baggage and driving characteristics are uploaded to the information center. Then, the navigation device 5 in the vehicle downloads the actual electric power consumption amount data stored in the information center when the usage conditions of the vehicle are the same as the probe vehicle. Thus, the navigation device 5 uses the actual electric power consumption amount data downloaded from the information center for calculating the estimated electric power consumption amount. Thus, the device 5 treats the actual electric power consumption amount data of the probe vehicle as the data, which is prepared by the navigation device 5 of the vehicle. In this case, the actual electric power consumption amount data obtained from the information center may be registered as information that is obtained by the navigation device 5.

When the usage conditions uploaded from the navigation device 5 does not coincide with those of the probe vehicle in the probe vehicle information database, the information center determines whether the usage conditions uploaded from the navigation device 5 are similar to those of the probe vehicle in the probe vehicle information database. When the usage conditions of the probe vehicle similar to the usage conditions uploaded from the navigation device 5 are stored in the probe vehicle information database, the navigation device 5 downloads the actual electric power consumption amount data of the probe vehicle from the probe vehicle information database. The navigation device 5 calculates the estimated electric power consumption amount by multiplying a compensation factor with the actual electric power consumption amount downloaded from the information center. The compensation factor corresponds to a difference between the vehicle and the probe vehicle. Specifically, when the usage conditions of the vehicle are substantially equal to those of the probe vehicle, the actual electric power consumption amount of the probe vehicle is used as the estimated electric power consumption amount. When the usage conditions of the vehicle are not substantially equal to those of the probe vehicle, the actual electric power consumption amount of the probe vehicle is not directly used as the estimated electric power consumption amount. In this case, the estimated electric power consumption amount is obtained by multiplying the compensation factor with the actual electric power consumption amount of the probe vehicle. Even when the probe vehicle is a gasoline powered vehicle and a diesel powered vehicle, and not the electric vehicle and the hybrid vehicle, the estimated electric power consumption amount of the plug-in vehicle can be estimated based on the actual energy consumption of the gasoline powered vehicle and the diesel powered vehicle.

An example of a general equation for calculating the estimated electric power consumption amount of the plug-in vehicle will be shown as follows.

$$(\text{EST } E \text{ P CON AMOUNT}) = (\text{ACT } E \text{ P CON AMOUNT OF PROBE } V) \times (\text{VEH CH } X) \times (\text{LOAD FACT } Y) \times (\text{DRI CH } Z)$$

Here, the term "EST E P CON AMOUNT" represents the estimated electric power consumption amount, the term "ACT E P CON AMOUNT OF PROBE V" represents the actual electric power consumption amount of the probe vehicle, the term "VEH CH X" represents the vehicle characteristics factor X, the term "LOAD FACT Y" represents the load factor Y, and the term "DRI CH Z" represents the driving characteristics factor Z.

The vehicle characteristics factor X is 1 when the type of the vehicle is equal to the type of the probe vehicle. The vehicle characteristics factor X is set to be in a range between 0 and 1 when the weight of the vehicle is smaller than the weight of the probe vehicle. The vehicle characteristics factor X is set to be larger than 1 when the weight of the vehicle is larger than the weight of the probe vehicle.

The load factor Y is set to be in a range between 0 and 1 when the weight of the passengers and the baggage in the vehicle is smaller than the weight of the passengers and the baggage in the probe vehicle. The load factor Y is set to be larger than 1 when the weight of the passengers and the baggage in the vehicle is larger than the weight of the passengers and the baggage in the probe vehicle.

The driving characteristics factor Z is set to be in a range between 0 and 1 when the number of repetitions of acceleration and deceleration of the vehicle is smaller than the number of repetitions of acceleration and deceleration of the probe vehicle. The driving characteristics factor Z is set to be larger than 1 when the number of repetitions of acceleration and deceleration of the vehicle is larger than the number of repetitions of acceleration and deceleration of the probe vehicle. Further, the driving characteristics factor Z is set to be in a range between 0 and 1 when the number of repetitions of steering while operations of the vehicle is smaller than the number of repetitions of steering while operations of the probe vehicle. The driving characteristics factor Z is set to be larger than 1 when the number of repetitions of steering while operations of the vehicle is larger than the number of repetitions of steering while operations of the probe vehicle. Here, the driving characteristics are determined based on similarity of the acceleration and deceleration patterns and/or the steering wheel operation angle patterns obtained by an in-vehicle sensor and the like assuming that the vehicle and the probe vehicle travel on the same road.

The above correction may be performed by the navigation device 5 when the information about the probe vehicle is downloaded. Alternatively, the navigation device 5 uploads information about the weight of the vehicle, the number of passengers in the vehicle, the weight of the baggage and the like to the information center. Then, the information center calculates the correction factors, and the navigation device 5 downloads the correction factors or the calculation results from the information center. Thus, the device 5 calculates the estimated electric power consumption amount.

The calculation method for calculating the estimated electric power consumption amount will be explained with reference to FIG. 8 when the vehicle travels along with the searched route. When the vehicle has traveled once along with the searched route, i.e., when the determination of step D1 is "YES," the estimated electric power consumption amount is obtained in step D3 by multiplying the safety factor with the actual electric power consumption at that time. In this case, the searched route for calculating the estimated electric power consumption amount may be equal to a whole route from the starting point to the destination that the vehicle has traveled once. Alternatively, the searched route for calculating the estimated electric power consumption amount may be a part of the route from the starting point to the destination that the vehicle has traveled once. When the vehicle has not traveled along with the searched route, i.e., when the determination of step D1 is "NO," in step D2, the device 5 or the information center determines whether the probe vehicle data in the probe vehicle information database is used for calculating the estimated electric power consumption amount. Specifically, the device 5 or the information center determines whether the usage conditions of the vehicle is substantially equal to or similar to the usage conditions of the probe vehicle, and the actual electric power consumption amount data of the probe vehicle is registered in the database in a case where the probe vehicle travels on the same route. When the actual electric power consumption amount data is registered, i.e., when the determination of step D2 is "YES," the estimated electric power consumption amount is calculated in step D4 by multiplying the correction factor corresponding to the usage conditions with the actual electric power consumption amount or the probe vehicle.

When the actual electric power consumption amount data corresponding to the same route as the searched route is not registered, i.e., when the determination of step D2 is "NO," the estimated electric power consumption amount is calculated in step D5 based on the slant angle of the road and the number of traffic lights along the road obtained from the map data, similar to the first embodiment. The navigation device 5 prepares the next charge schedule plan based on the estimated electric power consumption amount.

In the present embodiment, the navigation device 5 obtains the estimated electric power consumption amount based on the actual electric power consumption data collected by the probe vehicle, which travels on the same route as the searched route. The device 5 prepares the next charge schedule plan based on the estimated electric power consumption amount. Thus, the estimation accuracy of the estimated electric power consumption amount is improved. Thus, the charged electric power amount for driving the plug-in vehicle is sufficiently prepared, so that the shortage of the charged electric power amount is prevented. Thus, the device 5 surely prevents from being excessively charged with the commercial electric power source other than the solar photovoltaic generation system.

Further, when the vehicle has traveled once on the searched route, the device 5 calculates the estimated electric power consumption amount with using the actual electric power consumption amount at that time. Thus, the estimation accuracy of calculation of the estimated electric power consumption amount is much improved.

When multiple probe vehicle information data similar to or equal to the usage conditions of the vehicle are stored in the database of the information center, the average value of the multiple probe vehicle information data may be used as the probe vehicle information data.

Fourth Embodiment

A fourth embodiment will be explained with reference to FIGS. 9 and 10. In the first embodiment, since the traffic is heavy when the weather is not fine, the user may start to drive the vehicle earlier than the scheduled departure time in order not to be late. In this case, the charge of the battery 4 may not be completed. Thus, it may be necessary to charge the battery 4 at a place out of the house. Thus, the charge schedule may be affected by unanticipated behavior of the user. In the present embodiment, in view of the user behavior, the charge schedule is modified.

Figure 9:
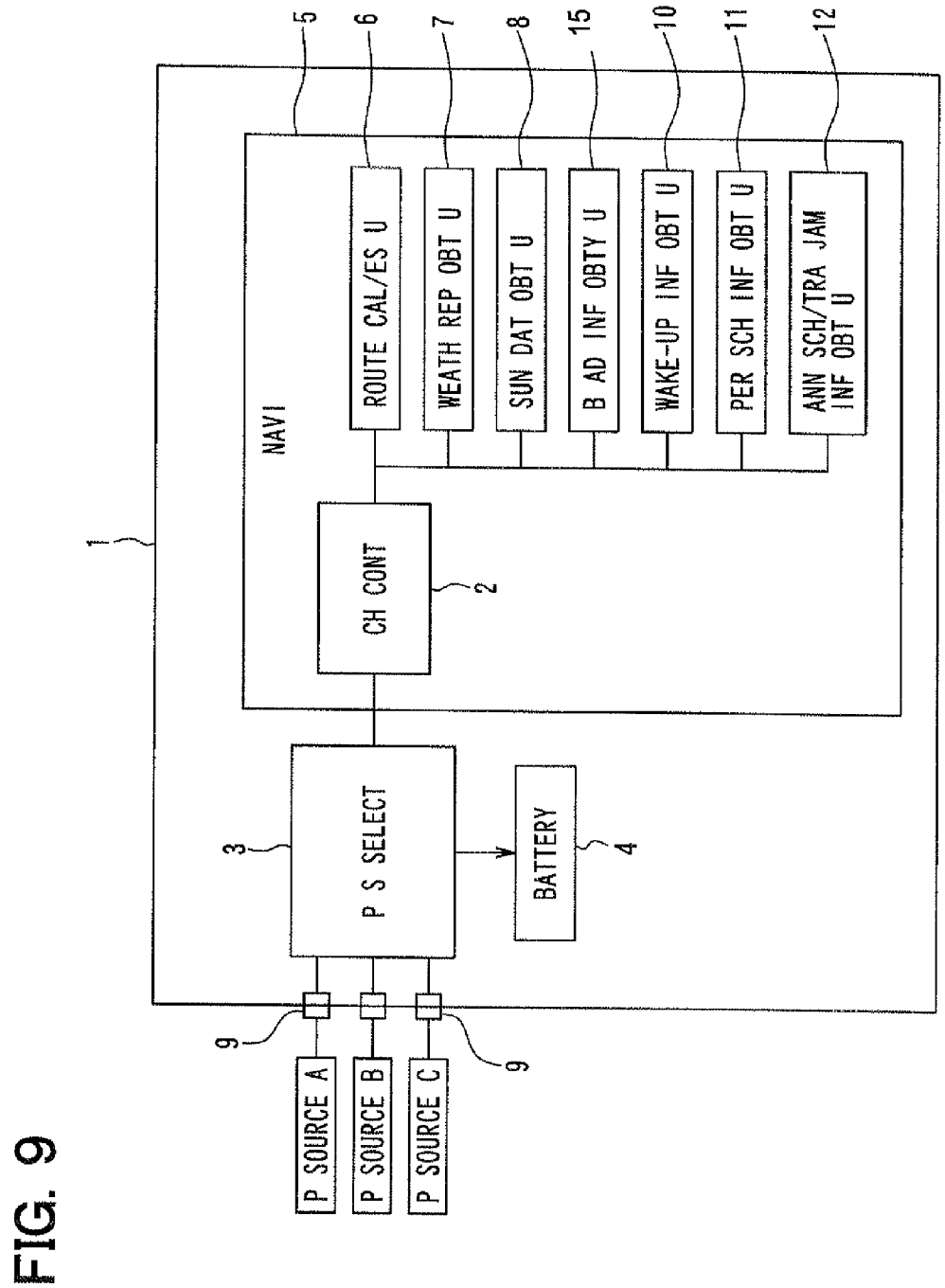
FIG. 9 is a block diagram showing a whole system of a charging controller in a plug-in vehicle according to a fourth embodiment.

FIG. 9 shows a block diagram of a whole system of a charging controller in a plug-in vehicle. The charge controller 2 providing an information obtaining element and a residual electric power amount determination element further includes a business advertisement information obtaining element 15, an user wake-up information obtaining element 10, a personal schedule information obtaining element 11 and an annual schedule and traffic jam information obtaining element 12. The navigation device 5 can obtain the following information through functions in the device 5.

(1) Weather information in each hour
(2) Electric light information in an user home
(3) Advertisement information of commercial facilities
(4) Schedule adjustment information of an user
(5) Annual event information such as opening and closing ceremonies of a school
(6) Sudden event information such as a traffic accident The weather information in each hour, the advertisement information of commercial facilities and the sudden event information such as a traffic accident are obtained from a certain server via the Internet, a VICS (vehicle information communications system, registered trade name) and the like. The electric light information in a user home is obtained from a home security server in the home. The schedule adjustment information of a user is obtained from an information terminal having a communication function such as a Bluetooth (registered trade name), which is carried with the user. The annual event information such as opening and closing ceremonies of a school is preliminary stored in a personal database.

Next, the modification of the charge schedule will be explained when the device 5 obtains the above information.

Figure 10:
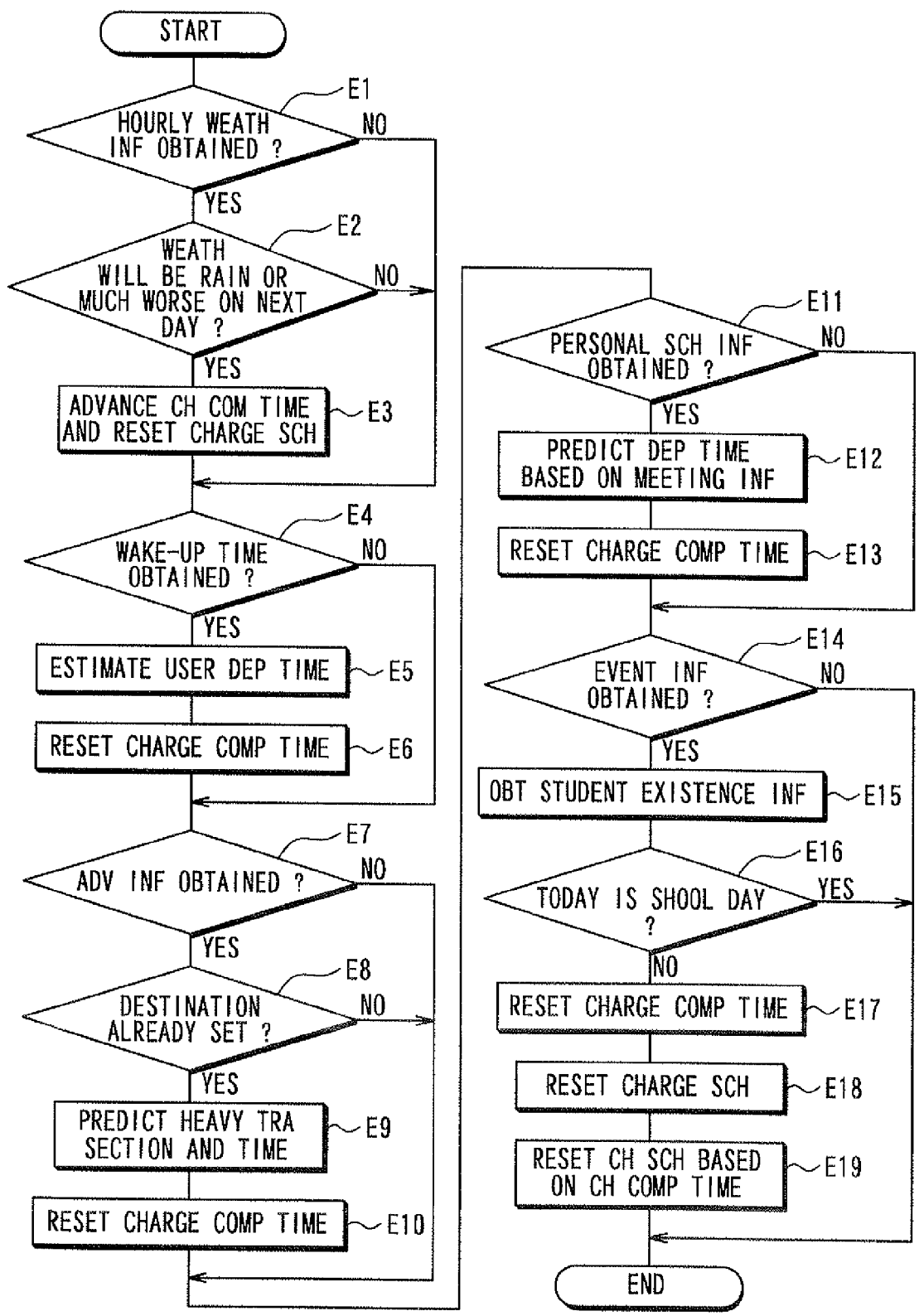
FIG. 10 is a flowchart showing a correction process of a charge schedule plan in a navigation device.

FIG. 10 is a flowchart showing the modification process in the charge controller 2.

The charge controller 2 determines in step E1 whether the device 5 obtains the weather information in each hour through the Internet. Further, the controller 2 determines in step E4 whether the device 5 obtains the user wake-up information. The controller 2 determines in step E7 whether the device 5 obtains the advertisement information of commercial facilities. The controller 2 determines in step E11 whether the device 5 obtains the personal schedule information. The controller 2 determines in step E14 whether the device 5 obtains the event information from the personal database.

(1) Charge Schedule Modification in View of Hourly Weather Information

When the device 5 obtains the current weather information from a weather report server through the Internet at predetermined intervals such as every few hours, i.e., when the determination of step E1 is "YES," it goes to step E2. In step E2, the controller 2 determines whether the device 5 receives a weather report such that the weather will be rain or much worse than rain at least three hours before a weekday commute time zone on the following day. When the weather report says that the weather will be worse, i.e., when the determination of step E2 is "YES," it goes to step E3. In step E3, the controller 2 resets the charge schedule such that the charge completion time is accelerated (i.e., advanced) by the user input time or the average of the accelerated time in a case where the departure time of the user were accelerated in the past. In this case, in step E19, the charge schedule is modified so as to compensate the accelerated time. In this case, when the charge schedule is formed in view of the electric power cost of the night time zone of the commercial power source, it may be preferable to ignore the night time zone of the commercial power source and to charge the battery 4 rapidly.

(2) Charge Schedule Modification in View of Wake-Up Information

On a weekday, the user has almost the same behavior pattern. However, the wake-up time may be changed from the average wake-up time since a certain event occurs. In this case, the departure time is changed from the average departure time. When the device 5 obtains the wake-up information such as the wake-up time of the user from the home security server, i.e., when the determination of step E4 is "YES," it goes to step E5. Here, since the home security server monitors the electric consumption amount of an electric meter of the home and the lights in the home, the device 5 or the server detects the wake-up time of the user based on the electric consumption amount (i.e., variation of the electric meter) and detection results of an optical sensor for detecting a turn-on operation of the light. In step E5, the controller estimates that the departure time of the user is earlier or later than the usual departure time. In this case, an estimation of the departure time after the user wakes up, and prepares for outgo for a certain minutes or hours is performed based on statistical information of the past preparation time from the wake-up time, which is obtained from the past behavior patterns of the user. Thus, in step E6, the scheduled charge completion time is advanced or set back according to the estimated departure time. In this case, when the scheduled departure time is advanced, the battery 4 is rapidly charged. When the scheduled departure time is delayed, the charge time of the solar photovoltaic generation system is extended so that the utilization factor of the solar photovoltaic generation system increases. Then, in step E19, the charge schedule is modified (reset) according to the estimated departure time or the scheduled charge completion time.

(3) Charge Schedule Modification in View of Advertisement Information

When a large scale electric appliance store plans a bargain sale on an opening ceremony, or a large sized supermarket plans a special bargain day such as every Tuesday, a traffic of a road around the large scale electric appliance store or the large sized supermarket may be heavy at an opening time or a bargaining time. Thus, when the device 5 obtains the advertisement information of commercial facilities from the information server, i.e., when the determination of step E7 is "YES," it goes to step E8. In step E8, the controller determines whether the destination has been preliminary set. When the destination has been preliminary set, i.e., when the determination of step E8 is "YES," the device 5 predicts the heavy traffic area and the heavy traffic time in step E9 based on the map data and the address of the commercial facilities, which is obtained from the advertisement information. In this case, based on the discount information such as the phrase of "20% off" in the bargain information, i.e., based on the discounting degree of the bargain, the device 5 predicts the magnitude (area) of the heavy traffic section. Based on the bargaining time in the bargain information, the heavy traffic time is predicted. In view of the heavy traffic section and time, the travel time from the current position to the destination increases because of the heavy traffic. Thus, in step E10, the scheduled charge completion time is advanced according to the travel time. Then, in step E19, the charge schedule is modified (reset) according to the travel time or the scheduled charge completion time. In this case, it is preferably to set the necessary electric power amount to be larger since electric power consumption efficiency is reduced because of the heavy traffic.

(4) Charge Schedule Modification in View of Personal Scheduler

When the device 5 obtains update information, i.e., schedule adjustment information in a schedule data of the mobile device having a communication function, which is carried by the user into the vehicle, i.e., when the determination of step E11 is "YES," it goes to step E12. In step E12, when the schedule data of the user is useful, for example, when the schedule data shows that a meeting is set early in the morning, the departure time is predicted in step D12. Then, in step E13, the scheduled charge completion time is advanced according to the meeting information. Then, in step E19, the charge schedule is modified (reset) according to the meeting information or the scheduled charge completion time.

(5) Charge Schedule Modification in View of Event Information from DB

The number of new employees commuting to a company increases in a few days from a first day of an annual year. In this case, the traffic of the road and the intersection around the company increases. The number of students commuting to a school becomes substantially zero when summer holidays start. In this case, the traffic of the road and the intersection around the school is reduced. Thus, in every year, although the date of events may be different, the traffic of roads is changed according to a periodic event. The events that cause the heavy traffic are registered in a database. When the device 5 obtains the event information stored in the database, and the event is held on the following driving day, i.e., when the determination of step E14 is "YES," it goes to step E15. In step E15, a camera mounted on the vehicle detects existence of students since the commuting students may cause the heavy traffic when the event information relates to the school. In this case, the traffic of roads around the school is usually heavy on a school day. The traffic is reduced when it is not the school day. In step E16, the controller determines whether it is a school day. When it is not a school day, i.e., when the determination of step E16 is "NO," in step E17, the heavy traffic time is predicted. In step E18, the scheduled charge completion time is delayed according to the event information. Then, in step E19, the charge schedule is modified (reset) according to the event information or the scheduled charge completion time.

Here, it is easy to distinguish based on an image shot by the camera whether a person is a student since the student wears the same school wear. In this case, it is preferable to switch a determination pattern between a summer wear pattern and a winter wear pattern in accordance with a season. The end of the spring holidays may be changed according to the number of holidays. However, assuming that the school starts at the first Monday, the school day is determined.

When the charge completion time is advanced according to the weather and/or the behavior of the user on the next driving day, if the battery is automatically charged rapidly, a lithium ion battery as a battery of the plug-in vehicle may be damaged so that the life time of the battery is reduced. Thus, the battery 4 is charged rapidly only when the residual electric power amount in the battery 4 is in a range between 20% and 80% of a battery capacity. Here, the range between 20% and 80% is defined as a rapid charge range. When the residual electric power amount in the battery 4 is out of the range between 20% and 80%, the battery 4 is charged normally. Thus, the charging speed is appropriately controlled, so that the electric power cost is minimized, and further, the lifetime of the battery 4 is improved.

Although not shown in FIG. 10, when the device 5 receives the sudden event information such as traffic accident information from the traffic information, the charge schedule may be reset such that the charge completion time is advanced to avoid the influence of the traffic jam.

The user may reset the scheduled departure time of the next driving day to be advanced since the user assumes that the next driving day is rain when the user gets off the vehicle. In this case, if the device 5 receives the recent weather information, and the weather report is changed from rain to cloud or fine at the scheduled departure time, the user may delay the scheduled departure time. Thus, the charge schedule may be reset again such that the charge completion time or the scheduled departure time is changed to a normal commute time. Thus, the utilization factor of the solar photovoltaic generation system until the scheduled departure time is improved. Further, since there is no traffic jam caused by rain, the vehicle arrives at the destination by the expected arrival time.

In the present embodiment, after the charge schedule is formed, when it is assumed that the charge completion time in the charge schedule is preferably changed from the original charge completion time, the charge schedule is modified. Thus, the battery 4 is surely charged.

Even when the charge completion time is advanced according to the modification of the charge schedule, the battery 4 is surely charged because the battery 4 is rapidly charged until the charge completion time. In this case, since the battery is rapidly charged only when the residual electric power amount in the battery 4 is appropriate. Thus, even when the battery 4 is rapidly charged, the damage of the battery 4 is minimized.

(Modifications)

In the above embodiments, the plug-in vehicle is the plug-in hybrid vehicle. Alternatively, the plug-in vehicle may be a plug-in electric vehicle. In this case, since the vehicle cannot runs when the battery 4 is completely discharged, it is necessary to set a safety factor in case of a charging process largely.

Instead of the charge controller in the navigation device 5, a ETC (electric toll collection) device functioning as a charging element may be mounted on the vehicle. The ETC device obtains information from the navigation device 5.

The navigation device 5 monitors the weather information. When the weather information is changed, the charge schedule plan may be revised. Alternatively, when the weather information is changed, the user may change the charge schedule. When the device 5 obtains traffic jam information, the device 5 may set the scheduled starting time to be earlier, and further, the device 5 may change the charge schedule according to the early starting time.

The commercial power source may include a 100-volt commercial power source and a 200-volt commercial power source. The electric power source selector 3 may switch between the 100-volt commercial power source and the 200-volt commercial power source.

The above disclosure has the following aspects.

According to a first aspect of the present disclosure, a charge controller for charging a battery of a plug-in vehicle with a plurality of electric power sources including a solar photovoltaic generation system, the controller includes: a driving route estimation element for estimating a next optimum driving route based on information, which an user input; an estimated electric power consumption amount calculator for calculating an estimated electric power consumption amount, which is necessary to travel the next optimum driving route; a weather information obtaining element for obtaining weather information until a next driving time; a sunshine information obtaining element for obtaining sunshine information until the next driving time; a solar photovoltaic generation electric power amount calculator for calculating a solar photovoltaic generation electric power amount until a next driving time based on the weather information and the sunshine information; an electric power shortage amount calculator for calculating an electric power shortage amount when the solar photovoltaic generation electric power amount is smaller than the estimated electric power consumption amount; a charge schedule preparation element for preparing a charge schedule, which represents a first charge time for charging the battery with the solar photovoltaic generation system and a second charge time for charging the battery by the electric power shortage amount with another electric power source; and a charge control element for controlling to charge the battery according to the charge schedule.

In the above controller, the battery is charged from the solar photovoltaic generation system until the next driving time to the utmost extent. Thus, the charge cost is reduced. Even when the weather is not fine and therefore, the solar photovoltaic generation electric power amount is smaller than the estimated electric power consumption amount, the battery is charged from the another electric power source. Thus, the battery is sufficiently charged for the next driving opportunity.

Alternatively, the another electric power source may be a commercial electric power source. The commercial electric power source has a low cost time zone and a high cost time zone. An electric power unit cost in the low cost time zone is lower than an electric power unit cost in the high cost time zone. The charge schedule preparation element prepares the charge schedule in such a manner that the second charge time is arranged in the low cost time zone to a maximum extent. In this case, even when the commercial electric power source is used for charging the battery, the charge cost is reduced since the second charge time is arranged in the low cost time zone to a maximum extent. Further, the low cost time zone may be a mid-night time zone.

Alternatively, the charge controller may further include: a commute usage indicator for indicating that an usage of the vehicle at the next driving time is a commute usage; and a memory for storing previous data of an actual electric power consumption amount. The estimated electric power consumption amount calculator calculates the estimated electric power consumption amount based on the previous data of the actual electric power consumption amount when the commute usage indicator indicates that the usage of the vehicle at the next driving time is the commute usage. In this case, the estimated electric power consumption amount is calculated with high accuracy based on the previous data of the actual electric power consumption amount.

Alternatively, the charge control element may control to switch from the solar photovoltaic generation system to the another electric power source when the charge control element determines that an actual charged electric power amount from the solar photovoltaic generation system is shorter than the calculated solar photovoltaic generation electric power amount while the battery is charged from the solar photovoltaic generation system. In this case, even when the weather changes during the charge from the solar photovoltaic generation system so that the electric power shortage may occur, the charge control element controls to switch from the solar photovoltaic generation system to the another electric power source so that the charge electric power amount is sufficient for the next driving opportunity.

Alternatively, the charge controller may further include: a schedule management element for managing schedule information, which is input by an user; and a schedule information obtaining element for obtaining the schedule information from the schedule management element. The charge schedule preparation element prepares the charge schedule based on the schedule information. In this case, it is not necessary for the user to input the schedule information by himself or herself.

Alternatively, the charge controller may further include: a selection element for selecting whether the schedule information is appropriate. The charge schedule preparation element prepares the charge schedule based on the schedule information when the selection element selects that the schedule information is appropriate. In this case, the schedule information is appropriately secured.

Alternatively, the charge controller may further include: a correction element for correcting the schedule information according to an operation of the user when the selection element selects that the schedule information is not appropriate. In this case, the schedule information is easily corrected.

Alternatively, the schedule management element may be a mobile communication device having a short range communication function. The schedule information obtaining element communicates with the mobile communication device by the short range communication function.

Alternatively, the schedule management element may be a server on a cloud computing network. The schedule information obtaining element communicates with the server via a wide area communication network.

Alternatively, the charge controller may further include: an actual electric power consumption data obtaining element for obtaining actual electric power consumption data of a probe vehicle, which is stored in an information center. The estimated electric power consumption amount calculator calculates the estimated electric power consumption amount based on the actual electric power consumption data of the probe vehicle when the probe vehicle is similar to the vehicle, and the probe vehicle has traveled on a same route as the next optimum driving route. In this case, the calculation accuracy of the estimated electric power consumption amount is improved.

Alternatively, when the vehicle has traveled on a same route as the next optimum driving route, the estimated electric power consumption amount calculator may calculate the estimated electric power consumption amount based on an actual electric power consumption amount in a case where the vehicle traveled on the same route. In this case, the calculation accuracy of the estimated electric power consumption amount is much improved.

Alternatively, the charge controller may further include: an information obtaining element for obtaining information, which affects the charge schedule or a driving condition of the vehicle after the charge schedule preparation element prepares the charge schedule. The charge schedule preparation element modifies the charge schedule when the charge schedule preparation element determines based on the information obtained by the information obtaining element that a scheduled departure time is changed or the next optimum driving route is crowded. In this case, the battery is surely charged.

Alternatively, the information obtained by the information obtaining element may include at least one of hourly weather information, wake-up information of the user, commercial activity information showing commercial activity for gathering people, personal schedule information obtained from a mobile device of the user and event information. In this case, even when the scheduled departure time is changed, the charge schedule is surely modified.

Alternatively, the charge control element rapidly may charge the battery from the another electric power source when the charge schedule preparation element modifies to advance the charge schedule. Even when the charge schedule is advanced, the battery is surely charged.

Further, the charge controller may further include: a residual electric power amount detection element for detecting a residual electric power amount in the battery. The charge control element rapidly charges the battery under a condition that the residual electric power amount in the battery is disposed in a predetermined rapid charge capable range. In this case, the damage of the battery caused by the rapid charge is reduced.

Alternatively, the charge control element may extend the first charge time when the charge schedule preparation element modifies to delay the charge schedule. In this case, the utilization factor of the photovoltaic generation system is improved.

According to a second aspect of the present disclosure, a navigation device for a vehicle includes: the charge controller according to the first aspect of the present disclosure. In this case, the navigation device easily performs to charge the battery of the plug-in vehicle with the plurality of electric power sources including the solar photovoltaic generation system.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A charge controller for charging a battery of a plug-in vehicle with a plurality of electric power sources including a solar photovoltaic generation system, the controller comprising:
   a processor and a memory;
   a driving route estimation element for estimating a next optimum driving route based on information, which an user input;
   an estimated electric power consumption amount calculator for calculating an estimated electric power consumption amount, which is necessary to travel the next optimum driving route;
   a weather information obtaining element for obtaining weather information until a next driving time;
   a sunshine information obtaining element for obtaining sunshine information until the next driving time;
   a solar photovoltaic generation electric power amount calculator for calculating a solar photovoltaic generation electric power amount until a next driving time based on the weather information and the sunshine information;
   an electric power shortage amount calculator for calculating an electric power shortage amount when the solar photovoltaic generation electric power amount is smaller than the estimated electric power consumption amount;
   a charge schedule preparation element for preparing a charge schedule, which represents a first charge time for charging the battery with the solar photovoltaic generation system and a second charge time for charging the battery by the electric power shortage amount with another electric power source;
   a charge control element for controlling to charge the battery according to the charge schedule; and
   an actual electric power consumption data obtaining element for obtaining actual electric power consumption data of a probe vehicle, which is stored in an information center,
   wherein the estimated electric power consumption amount calculator calculates the estimated electric power consumption amount based on the actual electric power consumption data of the probe vehicle when the probe vehicle is similar to the plug-in vehicle, and the probe vehicle has traveled on a same route as the next optimum driving route.

2. The charge controller according to claim 1,
   wherein the another electric power source is a commercial electric power source,
   wherein the commercial electric power source has a low cost time zone and a high cost time zone,
   wherein an electric power unit cost in the low cost time zone is lower than an electric power unit cost in the high cost time zone, and
   wherein the charge schedule preparation element prepares the charge schedule in such a manner that the second charge time is arranged in the low cost time zone to a maximum extent.

3. The charge controller according to claim 2,
   wherein the low cost time zone is a mid-night time zone.

4. The charge controller according to claim 1, further comprising:
   a commute usage indicator for indicating that an usage of the plug-in vehicle at the next driving time is a commute usage; and
   a memory for storing previous data of an actual electric power consumption amount,
   wherein the estimated electric power consumption amount calculator calculates the estimated electric power consumption amount based on the previous data of the actual electric power consumption amount when the commute usage indicator indicates that the usage of the plug-in vehicle at the next driving time is the commute usage.

5. The charge controller according to claim 1,
   wherein the charge control element controls to switch from the solar photovoltaic generation system to the another electric power source when the charge control element determines that an actual charged electric power amount from the solar photovoltaic generation system is shorter than the calculated solar photovoltaic generation electric power amount while the battery is charged from the solar photovoltaic generation system.

6. The charge controller according to claim 1,
   wherein, when the plug-in vehicle has traveled on a same route as the next optimum driving route, the estimated electric power consumption amount calculator calculates the estimated electric power consumption amount based on an actual electric power consumption amount in a case where the plug-in vehicle traveled on the same route.

7. A navigation device for a vehicle comprising:
   a charge controller for charging a battery of a plug-in vehicle with a plurality of electric power sources including a solar photovoltaic generation system, the controller including:
- a processor and a memory;
- a driving route estimation element for estimating a next optimum driving route based on information, which an user input;
- an estimated electric power consumption amount calculator for calculating an estimated electric power consumption amount, which is necessary to travel the next optimum driving route;
- a weather information obtaining element for obtaining weather information until a next driving time;
- a sunshine information obtaining element for obtaining sunshine information until the next driving time;
- a solar photovoltaic generation electric power amount calculator for calculating a solar photovoltaic generation electric power amount until a next driving time based on the weather information and the sunshine information;
- an electric power shortage amount calculator for calculating an electric power shortage amount when the solar photovoltaic generation electric power amount is smaller than the estimated electric power consumption amount;
- a charge schedule preparation element for preparing a charge schedule, which represents a first charge time for charging the battery with the solar photovoltaic generation system and a second charge time for charging the battery by the electric power shortage amount with another electric power source;
- a charge control element for controlling to charge the battery according to the charge schedule; and
- an actual electric power consumption data obtaining element for obtaining actual electric power consumption data of a probe vehicle, which is stored in an information center, wherein the estimated electric power consumption amount calculator calculates the estimated electric power consumption amount based on the actual electric power consumption data of the probe vehicle when the probe vehicle is similar to the plug-in vehicle, and the probe vehicle has traveled on a same route as the next optimum driving route.

8. A charge controller according to claim 1, wherein
the information center is an external system external to the plug-in vehicle, and
the actual electric power consumption data obtaining element obtains the actual electric power consumption data of the probe vehicle, which is stored in an information center, by communicating over a communication device coupled to the information center.

9. A charge controller for charging a battery of a plug-in vehicle with a plurality of electric power sources including a solar photovoltaic generation system, the controller comprising:
- a processor and a memory;
- a driving route estimation element for estimating a next optimum driving route based on information, which an user input;
- an estimated electric power consumption amount calculator for calculating an estimated electric power consumption amount, which is necessary to travel the next optimum driving route;
- a weather information obtaining element or obtaining weather information until a next driving time;
- a sunshine information obtaining element for obtaining sunshine information until the next driving time;
- a solar photovoltaic generation electric power amount calculator for calculating a solar photovoltaic generation electric power amount until a next driving time based on the weather information and the sunshine information;
- an electric power shortage amount calculator for calculating an electric power shortage amount when the solar photovoltaic generation electric power amount is smaller than the estimated electric power consumption amount;
- a charge schedule preparation element for preparing a charge schedule, which represents a first charge time for charging the batter with the solar photovoltaic generation system and a second charge time for charging the battery by the electric power shortage amount with another electric power source;
- a charge control element for controlling to charge the battery according to the charge schedule; and
- an information obtaining element for obtaining information, which affects the charge schedule or a driving condition of the plug-in vehicle after the charge schedule preparation element prepares the charge schedule, wherein the charge schedule preparation element modifies the charge schedule when the charge schedule preparation element determines based on the information obtained by the information obtaining element that a scheduled departure time is changed or the next optimum driving route is crowded.

10. The charge controller according to claim 9,
wherein the information obtained by the information obtaining element includes at least one of hourly weather information, wake-up information of the user, commercial activity information showing commercial activity for gathering people, personal schedule information obtained from a mobile device of the user and event information.

11. The charge controller according to claim 9,
wherein the charge control element rapidly charges the battery from the another electric power source when the charge schedule preparation element modifies to advance the charge schedule.

12. The charge controller according to claim 11, further comprising:
a residual electric power amount detection element for detecting a residual electric power amount in the battery,
wherein the charge control element rapidly charges the battery under a condition that the residual electric power amount in the battery is disposed in a predetermined rapid charge capable range.

13. The charge controller according to claim 9,
wherein the charge control element extends the first charge time when the charge schedule preparation element modifies to delay the charge schedule.

* * * * *